March 17, 1959  G. E. WEIR  2,877,937
MEASURING DISPENSER
Filed Nov. 1, 1957  2 Sheets-Sheet 1

INVENTOR.
GORDON E. WEIR
BY
his ATTORNEY.

March 17, 1959 G. E. WEIR 2,877,937
MEASURING DISPENSER
Filed Nov. 1, 1957 2 Sheets-Sheet 2

INVENTOR.
GORDON E. WEIR,
BY
*his* ATTORNEY.

United States Patent Office 2,877,937
Patented Mar. 17, 1959

2,877,937
MEASURING DISPENSER
Gordon E. Weir, Cleveland, Ohio

Application November 1, 1957, Serial No. 693,844

8 Claims. (Cl. 222—452)

This invention relates to a dispensing device for containers of finely comminuted and loose granular material, such as spices, sugar, flour, chemicals, and other materials to be dispensed, and particularly to a dispensing device which is adapted to meter and discharge accurately measured amounts of the material from the container during the dispensing operation.

A more specific object is to provide a device of this character which is relatively simple in construction, inexpensive to produce, and readily installable in a container whereby it can be installed permanently as an original part of the retail container in which the material is sold, and which can be disposed of as a disposable unit permanently attached to the container in which it is originally installed.

Another object of the present invention is to provide a device of this character which can be installed in the container after the container has received its charge of comminuted material and which may provide both the closure for the container as originally sold and as a dispensing and metering device when the contents of the container are to be used.

Another specific object of the present invention is to provide a device of this character in which none of the contents, in addition to that already metered and isolated from the remainder of the contents in the container, can be dispensed at a single operation of the device.

Another specific object is to provide a device of this character in which, during the dispensing operation, while one metering compartment is being discharged, another is being filled, and another, between the two, is maintained as a standby compartment which is completely filled and isolated from discharge either to the exterior of the container or back into the interior of the container, as a result of which, whenever the container is inverted and operated for discharging a metered amount of the contents, a metered amount is readily at hand and awaiting discharge in the standby compartment.

Another object is to provide a metering device in which the metered amounts are predetermined in fixed proportions of standard measures, for instance, fractions of, or multiples of, teaspoonfuls, cupfuls, and the like.

Other objects and advantages will become apparent from the following description wherein reference is made to the drawings in which.

Figure 1:
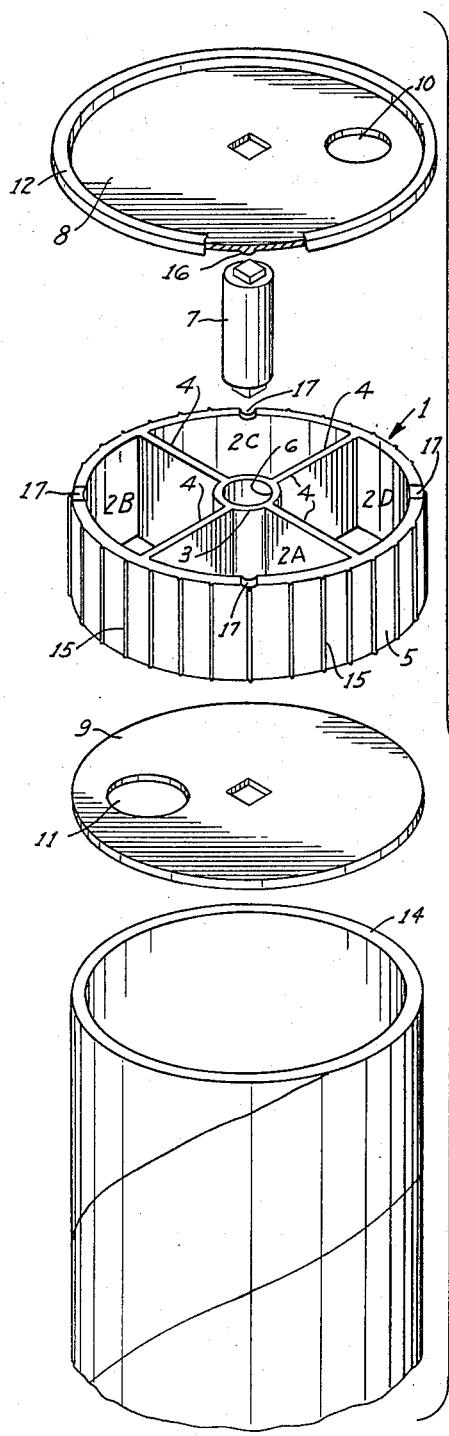
Fig. 1 is an exploded perspective view showing the elements of the present device and the upper end of a container with which they are to be associated.
Figure 2:
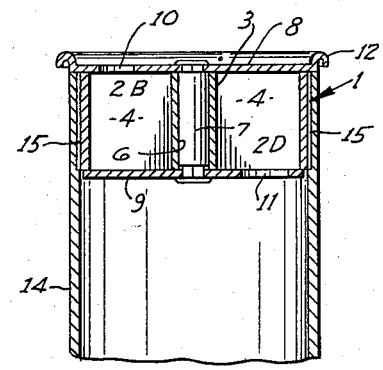
Fig. 2 is an upright, longitudinal, sectional view of the upper part of the container, showing the device installed.

Referring to the drawings, the device comprises a body metering member, indicated generally at 1, having a plurality of compartments 2A, 2B, 2C, and 2D, respectively, which are spaced apart circumferentially about a central axis and which are isolated from each other. In the preferred and simple form illustrated, the body metering member 1 is in the form of a central hub or bearing 3 from which radiate spider arms 4, the space between the arms providing the isolated metering compartments 2A through D.

In the preferred embodiment of the invention, the body member has an outer peripheral wall 5 which closes the radial outer limits of the compartments 2. The compartments 2 are open at both ends. The hub 3 is provided with an axial bearing passage 6 for receiving and rotatably supporting a coaxial shaft 7.

Mounted on opposite ends of the shaft 7 are an outlet cap 8 and an inlet cap 9, respectively. Each of the caps is secured to the shaft 7 for rotation therewith so that the caps are corotatable relative to the body metering member 1. The caps 8 and 9, together with their common shaft 7, provide the other metering member of the device.

The outlet cap 8 has a discharge passage 10 which is adapted to be aligned with the outer or outlet end of the compartments 2A, 2B, 2C, and 2D, selectively, upon relative rotation of the cap 8 and the body member 1. The inlet cap 9, on the other hand, has an inlet passage 11 which, likewise, is adapted to be aligned with the compartments at their inlet ends upon relative rotation of the caps and the body member 1.

The passages 10 and 11 are offset from each other circumferentially of the axis of the shaft 7. The caps are securely fastened to the shaft and thereby are held for rotation together and with their adjacent faces in juxtaposition with the ends of the body member 1 so as to normally close both the inlets and outlets of the compartments except insofar as a compartment inlet or outlet may be aligned with one of the openings 10 or 11. The number of compartments is preferably an even number, but at least three compartments are preferred for obtaining full benefits of the invention. Generally four, as illustrated, are preferred.

The passages 10 and 11 ae offset from each other circumferentially about the axis of the shaft 7 so that, while each may be placed in registry with each of the compartments selectively, they are never in registry with the same compartment concurrently. Preferably, they are spaced circumferentially so that, in the direction of rotation of the metering members, there is one compartment which is closed at both ends by the caps between the compartment with which the outlet opening 10 is in registry and the compartment with which the inlet opening 11 is in registry. Thus, at least one standby compartment is provided between the one which is being discharged and the one which is being filled.

The outlet cap 8 is provided with suitable means, such as the bead rim 12, by virtue of which the body metering member 1 and the member comprising the caps 8 and 9 and shaft 7 can be rotated relative to each other when the device is installed in a container.

In the form illustrated in Fig. 1, the device is to be installed in the open end of a cylindrical container 14 which is preferably formed of spirally wound paper. For this purpose, the outer peripheral wall 5 of the body member 1 is preferably of a proper size so that the device can be installed in the open end of the container 14 by press fitting it into place while it is held in coaxial relation with the container. If desired, the outer peripheral wall 5 of the body metering member 1 may be provided with projections, such as longitudinally extending flutes 15, which are slightly sharpened at their outer edges and which, when the device is press fitted into the container, dig into the internal peripheral wall of the container sufficiently to anchor the body member 1 in place axially and to hold it against rotation circumferentially of the container.

The device is pressed axially into the container a distance such that the outer cap 8 rests substantially at the end of the body with the rim 12, or means to be grasped for rotating the cap 8, readily accessible to the operator.

Figure 4:
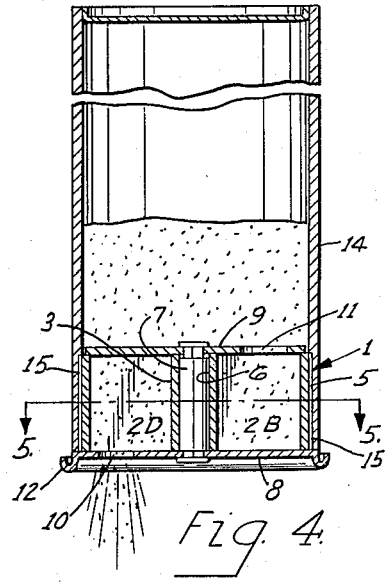
Fig. 4 is a view, similar to Fig. 2, with the container and device inverted for dispensing the comminuted materials, and is taken on the line 4—4 in Fig. 5.
Figure 3:
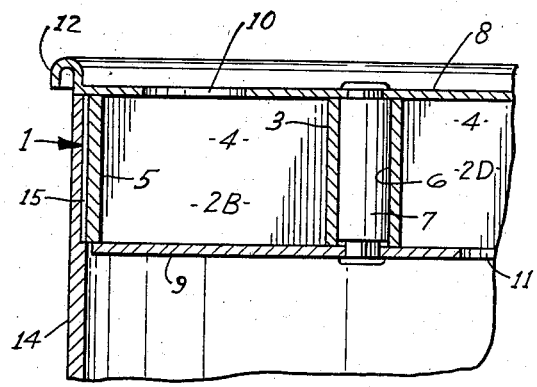
Fig. 3 is an enlarged, fragmentary, sectional view, similar to Fig. 2, showing the press fit of the device into the upper end of the container and the operating clearances of the various parts.

When the device is installed in the container and the container is inverted, as illustrated in Fig. 4, the comminuted material from the interior of the container may pass through the opening 11 into the compartment 2B aligned therewith.

Figure 5:
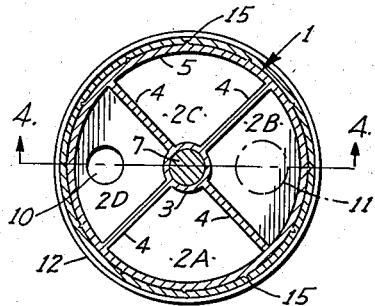
Fig. 5 is a horizontal cross-sectional view of the inverted container and is taken on the line 5—5 in Fig. 4.

Assuming none of the compartments is filled, except the compartment 2B, upon next rotation of the cap in a clockwise direction in Fig. 5, the opening 11 is aligned with the compartment 2A so that the compartment 2A becomes filled. At the same time the opening 10 is disposed beneath the compartment 2C. Upon the next rotation of the cap, the opening 11 is aligned with the compartment 2D, which thereupon fills. Concurrently, the opening 10 is aligned with the compartment 2B which discharges.

At this stage of operation, the compartment 2B has discharged, the compartment 2A acts as a standby compartment and is filled with material and is blocked at both its inlet and its outlet by the caps 8 and 9, and the compartment 2D is full.

If, in this condition, another measured amount of material is required, the cap is additionally rotated in the clockwise direction so as to align the opening 10 with the compartment 2A which thereupon discharges and concurrently to align the opening 11 with the opening 2C which thereupon fills. Thus between the compartment 2A which is discharging and the compartment 2C which is being filled, there is a standby compartment 2D which is filled and closed at both ends by the caps so that, if the container is placed upright, the standby compartment remains filled. Thus, upon the next inversion, there is a full standby compartment instantly ready to operate immediately upon rotation of the cap.

The port 11 is preferably sufficiently large so that the compartment with which it is aligned can be filled almost instantly. The opening 10 is preferably somewhat smaller.

Thus, during operation, the compartment diametrically opposite from the one that is discharging is being filled, and the one between the one discharging and the one being filled remains filled with the material and closed at both ends. Thus, placing the container back in its original normal position with the device at the upper end does not discharge the standby compartment, which is next to be used, back into the container.

Preferably, the compartments are four in number. The ports 10 and 11 are so spaced circumferentially of the axis of the shaft 7 and are of such size that they cannot be in communication with the same compartment at any one time although the passage 11 may be in communication with more than one compartment at the same time so long as it will not drain the standby compartment back into the container when the device is inverted into its original position. For example, in Fig. 5, the opening 11 may be large enough to communicate with compartments 2A and 2B while opening 10 is in registry with compartment 2D, but in any event, the opening 11 must not be so large as to be in communication with the compartment 2D before the opening 10 has passed entirely beyond the wall between compartments 2D and 2C. In short, openings 10 and 11 must never be in registry with the same compartment at the same time.

Generally, it is desirable to have some means for indicating the relatively rotated position of the body metering member 1 and the other metering member comprising the caps 8 and 9 and shaft 7. For this purpose, the cap 8 is provided with a boss or detent 16 which is arranged to engage selectively or successively suitable identations 17 in the peripheral wall 5 of the body member 1 and thus yieldably to arrest and center the caps with the openings 10 and 11 in proper registry with the compartments.

Preferably, the body metering member 1, including the central hub 3, the spider walls 4, and the peripheral wall 5, is formed of plastic in one piece.

The other metering member, including the caps 8 and 9 and shaft 7, also may be formed of plastic and the caps press fitted onto the square ends of the shaft 7 and the projecting square ends then heated and pressed out to anchor the caps firmly into position.

The spacing of the caps axially is such that they can rotate freely yet hold snugly to the opposite ends of the body member 1.

The material can flex sufficiently to permit the detent 16 to ride into and out of the depressions 17. The diameter of the cap 9 is very slightly less than the outer diameter of the peripheral wall 5 so that it can rotate freely and not be frictionally bound by the interior wall of the container even after the peripheral wall 5 is pressed firmly against the container wall.

Figure 6:
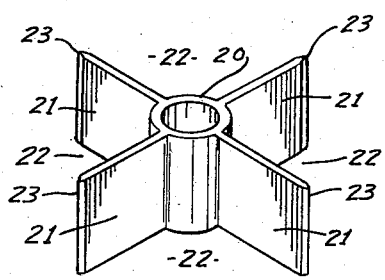
Fig. 6 is a perspective view of a spider similar to that included in Fig. 1 but without the peripheral wall, and illustrates a modification of the invention.
Figure 7:
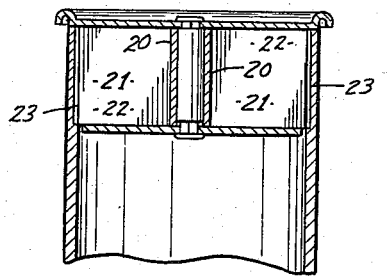
Fig. 7 is a fragmentary, longitudinal, sectional view showing the spider of Fig. 6 installed in a container.

In Figs. 6 and 7, there is illustrated a structure in which the body metering member 1 is not provided with the peripheral wall 5. Instead, the body comprises merely the central hub 20 and spider walls 21. When this type of body member is installed in the container, the ends of the walls 21 engage the inner periphery of the wall of the container and the wall of the container itself provides the peripheral wall closing the sides of compartments 22 between the arms, thus, in effect, providing essentially the same type of compartments as provided in the form indicated at 2A through D in Fig. 1. In this modified form, the ends of the ribs are provided with projections, such as 23, which may be in the form of slight flutes or ridges which press into and indent the inner wall of the container and secure the spider fixedly in place in coaxial relation with the container.

Figure 8:
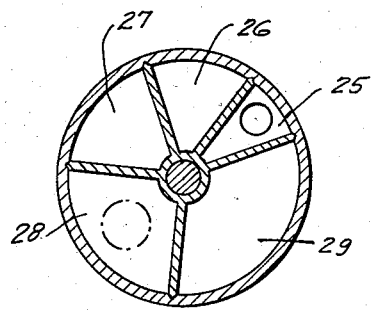
Fig. 8 is a top plan view, similar to Fig. 4, illustrating a modification of the invention wherein the metering compartments are different fractions of a standard measure, respectively.

Again, in some instances, it is desirable to provide in the device a plurality of compartments which are of different sizes. For instance, in Fig. 8, a number of compartments are shown, these being indicated at 25 through 30. Each of these compartments is a different size but each is a fraction of, or a multiple of, a standard measure, for example, a commonly used fractional part of a standard measure or a combination of more than one standard measure.

Generally, however, it is preferred that the compartments be the same size, each being determined by the formula $nx$, in which $x$ represents a standard measure and $n$ equals a constant. Thus $x$ may be one teaspoon, or one tablespoon, or one cup, whereas $n$ would be one half, one quarter, one third, or two.

It is more satisfactory to have the compartments equal to the same fractional part of the standard unit which is most likely to be used. For example, if teaspoonfuls are to be used, four or more compartments may be used, each comprising one quarter teaspoonful, so that the device could be used for measuring from one quarter up to any number of combinations of teaspoonfuls and fractional parts thereof without difficulty.

The device has many advantages in that the comminuted materials are stored in the standby compartment always ready for instant use upon inversion of the device and rotation of the outer cap. There is no loss of the material, no waste, and no accessory equipment to be handled and subsequently cleaned and restored. The device is so inexpensive that it can be thrown away along with the container when the container is empty.

Thus, with the present device, there is a selective and progressive discharge of the material from the container from one compartment while the standby compartment stands ready and filled, and another compartment therebeyond in a direction of rotation is being filled.

If desired, a plurality of standby compartments can be provided, particularly if the device is made so that the cap is to be rotated only in one direction. The standby compartments, regardless of number, have the advantage in that, once they are filled, reinversion of the container to an upright position with the device disposed at the upper end does not drain these compartments back into the container, and, consequently, as soon as the container is inverted and the cap turned, there is a completely measured charge which immediately begins discharging from the device to the outside.

If desired, a conventional closure or sifting cap can be mounted on the shaft 7 for rotation relative thereto and in snug face to face contact with the outer face of the cap 8.

Having thus described my invention, I claim:

1. A measuring device for dispensing metered amounts of comminuted material from a container and comprising a metering body member adapted to be installed in fixed position in a container and, when so installed, to provide at least three compartments, which are in fixed position relative to the body member, each of which has an inlet at one end of the body member for admitting material from within the container and an outlet at the other end of the body member for discharging the admitted material, said compartments being spaced apart laterally from each other about a common central axis, a cooperating metering member including an inlet cap common to the inlets of the compartments, an outlet cap common to the outlets of the compartments, and a shaft mounted in the body member in coaxial relation to the central axis for rotation about its axis and connected at its ends to the caps in coaxial relation thereto and securing the caps for rotation together about the central axis throughout complete revolutions in at least one direction and in juxtaposition with the ends of the body member, respectively, and normally closing the inlets and outlets of the compartments, means on the outlet cap adapted to be grasped by the hand of an operator and manipulated to rotate the caps together in said one direction, each cap having an opening therein, said openings being so shaped and spaced apart about the central axis that the opening of the inlet cap can be brought into registry with each of the inlets of the compartments and the opening of the outlet cap can be brought into registry with each of the outlets of the compartments with the opening of the inlet cap always disassociated from the compartment with which the opening of the outlet cap is currently associated, and with at least one compartment positioned, in said direction of rotation, to the rear of the compartment aligned with the opening in the outlet cap and in advance of the compartment aligned with the opening in the inlet cap when the device is inverted so that the outlet cap is beneath the inlet cap, and said one compartment being closed at both ends concurrently by the caps.

2. The structure according to claim 1 characterized in that there are at least four compartments, the caps are rotatable together in opposite directions, selectively, through at least one complete revolution in each direction of rotation, and the spacing and shape of the openings are such that in each direction of relative rotation of the caps and compartments there is at least one compartment closed at both ends by the caps between the compartment with which the opening of the inlet cap is in registry and the compartment with which the opening of the outlet cap is in registry.

3. The structure according to claim 1 characterized in that compartments, when the body member is uninstalled, are open at the sides at the outer periphery of the body member and the side wall of the container closes the open ends of the compartments when the body member is installed.

4. The structure according to claim 1 characterized in that said body member is in the form of a central bearing portion having an axial passage rotatably supporting the shaft, partition walls radiate outwardly from the central bearing portion, and a peripheral wall is connected to the partition walls and provides the outer wall of the compartments.

5. The structure according to claim 1 characterized in that the body member at its outermost limits, has a plurality of circumferentially spaced projections adapted to press into, and to indent, a wall of a container and frictionally bind the body member firmly thereto when the body member is pressed axially into installed position in an end of the container, and to retain the body member in fixed position in said end of the container.

6. The structure according to claim 5 characterized in that the body member is adapted to be press fitted, by movement in a direction axially of the body member, into the open end of a container in coaxial relation to the container, with the rim of the outer cap accessible for gripping for rotation by the hand of an operator when the body member is installed in the container, and the body member has a peripheral wall which fits in sealed relation to the wall of the container when the body member is press fitted into the container.

7. The structure according to claim 1 characterized in that said compartments are identical in size and each has a capacity equal to $nx$, where $n$ is a constant and $x$ is a standard measure.

8. The structure according to claim 1 characterized in that said compartments are different in size and have capacities equal to $vx$, where $v$ is a different value for each compartment and $x$ is a standard measure.

References Cited in the file of this patent

UNITED STATES PATENTS

| | | |
|---|---|---|
| 480,146 | Souder | Aug. 3, 1892 |
| 1,005,130 | Andrews | Oct. 10, 1911 |
| 2,805,799 | Hileman | Sept. 10, 1957 |